(No Model.)
J. LYKKE.
SAW.
No. 493,934. Patented Mar. 21, 1893.
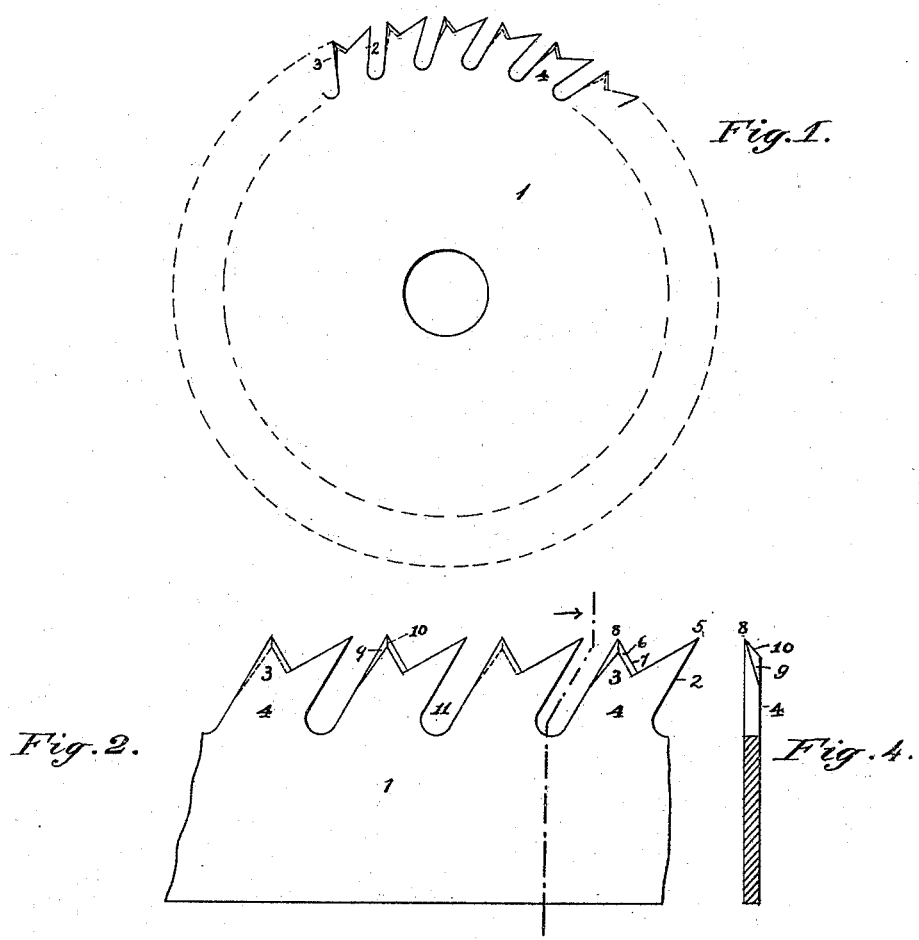
Fig. 1.
Fig. 2. Fig. 4.
Fig. 3.
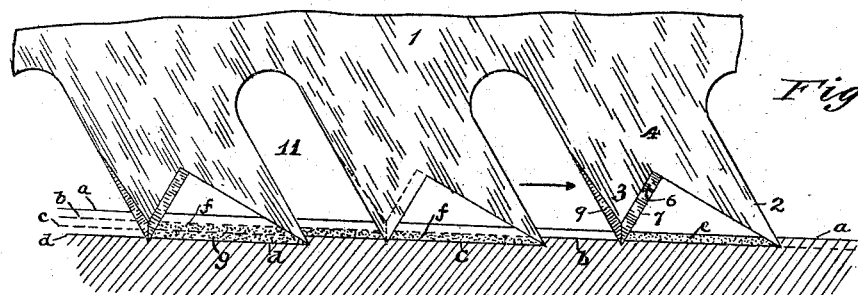
Fig. 5.
Attest:
Andrew W. Steiger
Martin Layden
Inventor:
John Lykke
By Jacob Felbel
Att'y

United States Patent Office.

JOHN LYKKE, OF NEW YORK, N. Y., ASSIGNOR OF ONE-THIRD TO JACOB FELBEL, OF SAME PLACE.

SAW.

SPECIFICATION forming part of Letters Patent No. 493,934, dated March 21, 1893.

Application filed May 12, 1890. Serial No. 351,423. (No model.)

*To all whom it may concern:*

Be it known that I, JOHN LYKKE, a subject of the King of Denmark, and a resident of New York city, in the county of New York and State of New York, have invented certain new and useful Improvements in Saws, of which the following is a specification.

My invention relates to the teeth of saws, and has for its main object the production of a saw which shall cut and at the same time plane or smooth the wood being operated upon.

To this end my invention consists in the features of construction hereinafter more fully described and particularly pointed out in the appended claim.

In the accompanying drawings, Figure 1 is a side elevation of a circular saw involving my invention. Fig. 2 is a similar view of a reciprocating saw, enlarged, and embodying my invention. Fig. 3 is a top view of the same, enlarged. Fig. 4 is a vertical cross-section on the line $x, x$, of Fig. 2. Fig. 5 is a side elevation, exaggerated, to illustrate the action of the saw.

In the several views the same part will be found designated by the same numeral of reference.

1 represents the body or blade of the saw.

2 represents a cutting or ripping tooth, and 3 a planing or smoothing tooth. These teeth are preferably arranged in pairs and each pair is formed or arranged at the end of a shank or section 4.

The ripping tooth may be of any approved construction, but I prefer to make it in about the manner shown and with a straight chisel edge 5 arranged at right angles to the body of the saw.

The planing tooth is arranged in rear of the ripping tooth and in the construction of this tooth rests the gist of my invention. The front or face of the planing tooth is ground or filed away on a bevel, 6, to form a straight knife-edge 7. The beveled surface 6, and the knife-edge 7, extend clear up to the point 8, of said tooth. The back of said tooth is also ground or filed away on the same side or face to form another beveled surface 9. The junction of the two oppositely-disposed bevels which is represented by the line 10, forms the top of the tooth, and as will be seen this top from the sharp point 8 is given considerable pitch or inclination (which is very desirable and important) and the bevel 9 is provided for the purpose of obtaining this degree of pitch or slant. Without the bevel 9 the necessary inclination of the top of the tooth could not be obtained.

In front of the ripping-tooth is a dust or chip receptacle 11, which operates in substantially the usual manner.

The planing teeth 3 are alternately beveled on opposite sides as represented in order to plane or smooth both sides of the kerf, and the points 8 of said teeth are arranged in line with the chisel or cutting edges of the ripping teeth; that is to say, the points 8 and the edges 5 in a circular saw lie in the same circle, while in a reciprocating saw they lie in a straight line.

It is to be observed that there is no set to the saw, the finished kerf being of the same width as the width of the ripping teeth. The absence of all set to the saw I consider a great advantage, having found in practice that the planing teeth if set fail to produce the same quality of work that may be obtained by said teeth if unprovided with any set.

Referring to Fig. 5, wherein I have endeavored to illustrate the action of my improved saw-teeth, in a reciprocating saw, it will be seen that the saw is supposed to be traveling in the direction of the arrow and that the first ripping tooth represented has passed through and cut the wood the distance between the lines $a$ and $b$. During this travel of said tooth the first planing tooth has planed one side of the kerf between said lines to the locality at which it is now shown, and is about to plane the stippled portion $e$ shown in front of it. The side of the kerf toward the observer it will be understood is not planed by said tooth.

The second ripping tooth following in the kerf already started cuts deeper therein and down to the line $c$. The second planing-tooth planes the side of the kerf toward the observer and all that portion between the lines $a$ and $c$, the same being the depth of the cut made by the two preceding ripping teeth.

The third ripping tooth likewise following in the kerf already made cuts still deeper into the wood and down to the line *d*. The third planing tooth now planes the opposite side of the kerf from the line *b* to the line *d*, or those portions cut by the two preceding ripping teeth, shown by the stippled work *f* and *g*.

It will be seen that as the succeeding ripping teeth of the saw cut deeper into the wood the planer teeth which follow operate to plane or smooth both sides of the kerf in the manner explained; that is to say, each planer tooth planes or smooths on one side the cut made by the two preceding ripping teeth.

In practice the speed of the saw relatively to the feed of the wood is such that each ripping tooth makes an extremely slight cut into the wood and each planing tooth is required to do its work near to or at the extreme point of said tooth, and hence the importance of having the planing edge of each planing tooth effective to the extreme point of the tooth, which point itself should be sharp, as shown.

Inasmuch as any variation in the angle or direction of the cutting edge of the planing tooth would produce a variable planing result upon the wood, it is therefore most important that the cutting edge shall be straight and uniform to the extreme point so that the tooth may plane the wood for the entire length of its cut at the same angle and hence produce a uniformly smooth surface.

The inclination or pitch of the top of the tooth formed by the two opposite bevels should be sufficient, as shown, to provide a space or passageway large enough to permit all of the particles planed to pass through and discharge into or enter the chip and dust chamber or receptacle in rear of the planer tooth.

The required inclination or pitch of the top of the tooth to afford a sufficient clearing capacity can be practically secured, so far as my knowledge extends, only by forming the supplemental or additional bevel 9 on the tooth on the same side as that which is formed to produce the cutting edge.

I have carried out my invention in practice and am daily using saws embodying the same. I find that the action of the planing teeth is such as to produce a uniform and perfectly smooth cut, without liability of the saw clogging or burning the wood. The saw may be used either with the grain or crosswise of it.

A saw-tooth made in accordance with my invention may be easily and cheaply constructed and may be readily and conveniently sharpened when dulled by use.

I do not limit myself to the exact grouping or arrangement of the teeth as two or more planing teeth may be interposed between a pair of ripping teeth.

A saw constructed like that herein shown will cut a narrower kerf than one which has a set to the teeth, and by making a ripping tooth and a planing tooth integral with one shank or section a stronger and more durable saw may be produced.

What I claim as new, and desire to secure by Letters Patent, is—

A saw having two sets of teeth, 2 and 3, arranged in groups, each group being between a pair of chip-chambers 11, the teeth 2 being chisel or ripping-teeth and operating to cut or form the kerf, and the teeth 3 being planer teeth operating simply to smooth the sides of the kerf formed by the chisel or ripping teeth, said planer teeth terminating each in a sharp point 8 and having each beveled surfaces 6 and 9 on the same side to form respectively a straight planing edge 7 extending out to said point 8 and a passage way for the clearance of the particles planed, the planer teeth being alternately beveled on opposite sides to enable both sides of the kerf to be smoothed.

Signed at New York city, in the county of New York and State of New York, this 10th day of May, A. D. 1890.

JOHN LYKKE.

Witnesses:
MARTIN LAYDEN,
GEO. W. WEIFFENBACH.